US012623940B2

(12) United States Patent
Zhang et al.

(10) Patent No.: US 12,623,940 B2
(45) Date of Patent: May 12, 2026

(54) MABR-BASED METHOD FOR TREATING RARE EARTH MINE TAILWATER

(71) Applicant: GUANGDONG UNIVERSITY OF TECHNOLOGY, Guangzhou City (CN)

(72) Inventors: Yuan Zhang, Guangzhou City (CN); Honghao Xie, Guangzhou City (CN); Xinfei Zhang, Guangzhou City (CN); Jianhui Zhan, Guangzhou City (CN); Yuliang Wu, Guangzhou City (CN); Zhifeng Yang, Guangzhou City (CN)

(73) Assignee: GUANGDONG UNIVERSITY OF TECHNOLOGY, Guangzhou City (CN)

( * ) Notice: Subject to any disclaimer, the term of this patent is extended or adjusted under 35 U.S.C. 154(b) by 416 days.

(21) Appl. No.: 18/346,341

(22) Filed: Jul. 3, 2023

(65) Prior Publication Data

US 2024/0140842 A1 May 2, 2024

(30) Foreign Application Priority Data

Oct. 31, 2022 (CN) .......................... 202211366315.9

(51) Int. Cl.
*C02F 3/12* (2023.01)
*C02F 103/10* (2006.01)

(52) U.S. Cl.
CPC ........ *C02F 3/1268* (2013.01); *C02F 2103/10* (2013.01); *C02F 2203/006* (2013.01); *C02F 2209/42* (2013.01); *C02F 2307/14* (2013.01)

(58) Field of Classification Search
CPC ............... C02F 3/1268; C02F 2103/20; C02F 2103/10; C02F 2209/06; C02F 2307/14; C02F 2001/007; C02F 9/00

USPC ......................................................... 210/602
See application file for complete search history.

(56) References Cited

FOREIGN PATENT DOCUMENTS

| CN | 106830547 A | * | 6/2017 | ................ C02F 9/00 |
| CN | 110171906 A | * | 8/2019 | ................ C02F 9/00 |
| CN | 110563252 A | * | 12/2019 | ................ C02F 1/66 |
| CN | 114804334 A | * | 7/2022 | ................ C02F 3/34 |

OTHER PUBLICATIONS

Cheng et al, CN 114804334 English machine translation, pp. 1-8 (Year: 2022).*
Hong et al, CN 110563252 English machine translation, pp. 1-6 (Year: 2019).*
Ji, CN 110171906 English machine translation, pp. 1-8 (Year: 2019).*
Li et al, CN 106830547 English machine translation, pp. 1-7 (Year: 2017).*

* cited by examiner

*Primary Examiner* — Claire A Norris

(57) ABSTRACT

The present disclosure provides an MABR-based method for treating rare earth mine tailwater, comprising: introducing rare earth mine tailwater into a sedimentation pond and simultaneously injecting pig farm breeding tailwater into the sedimentation pond, and fully mixing the two in the sedimentation pond for solid particulate sedimentation; performing pH adjustment, MABR enhancement treatment, percolation treatment with a percolation dam, and ecological purification with an ecological purification pond; and overflowing and discharging the rare earth mine tailwater purified by the ecological purification pond to a natural water body.

15 Claims, 7 Drawing Sheets

052

054-1

037

055

057

057

038

30

056

037

135

30

037

MABR-BASED METHOD FOR TREATING RARE EARTH MINE TAILWATER

CROSS REFERENCE

The present disclosure claims priority of Chinese Patent Application No. 202211366315.9, filed on Oct. 31, 2022, the entire contents of which are hereby incorporated by reference in their entirety.

TECHNICAL FIELD

The present disclosure relates to the field of rare earth mine tailwater purification technology, and in particular to a MABR-based method for treating rare earth mine tailwater.

BACKGROUND

Rare earth resources are one of the important mineral resources in China. Due to the natural advantages of China's rare earth resources and the advanced rare earth key separation technology, China has become the world's leading rare earth producer. With the continuous development of new material industries such as rare earth permanent magnet materials and rare earth hydrogen storage materials in recent years, the demand for rare earths in China's market is also increasing, and the production of rare earths in China is also increasing year by year. However, the process of mining and smelting of rare earth mines may be a big ecological problem. Taking ion adsorption rare earth ore in the south of China as an example, the main mining process is usually soaking the soil with ammonium sulfate, replacing rare earth elements in the ionic state into solution, and then precipitation with oxalic acid or ammonium carbon to obtain rare earth concentrate of more than 92% grade; this mining in the specific operation is divided into heap leaching, pool leaching and, in situ leaching, of which, the first two methods have been banned, while in the process of the in situ leaching, a considerable amount of rare earth mine tailwater will be formed. The tailwater has the characteristics of high ammonia nitrogen, low COD, high salinity, high turbidity, and large changes in water quality and quantity, etc., which will have a great impact on the water cycle of the natural environment if not treated properly.

The traditional treatment method of rare earth mine tailing water is to treat the tailwater by percolation through ecological ditch. However, the characteristics of rare earth mine tailwater such as high acidity (pH 3-5), high nitrogen content (50-300 mg/L), and low carbon content ($COD_{Cr}$≤20 mg/L) seriously affect the treatment effect of the ecological ditch. Therefore, the industry developed biochemical treatment method, of which the main principle is through nitrification and denitrification, short-course nitrification denitrification or anaerobic ammonia oxidation. The process parameters of short-course nitrification denitrification are strictly controlled, and anaerobic ammonia oxidation has high requirements for water temperature and more stringent control for process parameters; therefore, the above two are difficult to be practically applied in the treatment of rare earth tailwater from surface source pollution. Nitrification and denitrification are the main biochemical treatment processes for rare earth tailwater. For example, nitrification and denitrification biochemical process of activated sludge method and nitrification and denitrification process of contact oxidation method are applied in actual rare earth mine tailwater treatment projects. Nitrification is to transform ammonia nitrogen into nitrate nitrogen by nitrifying bacteria, and the main biochemical reaction conditions are water temperature, dissolved oxygen, and alkalinity. Denitrification is to transform nitrate nitrogen into nitrogen gas by denitrifying bacteria, and the main biochemical reaction conditions are water temperature and carbon source. These processes may use activated sludge (SBR), membrane bioreactor (MBR), and aeration biofilter (BAF), which have high requirements for operating temperature, carbon source demand, and oxygen supply, etc. Carbon source supply and oxygen supply require huge energy consumption, and the disadvantage of high energy consumption limits the use of these processes on a large scale.

Therefore, there is an urgent need to develop a method that consumes less energy and at the same time can efficiently treat the rare earth mine tailwater.

SUMMARY OF THE DISCLOSURE

The main purpose of the present disclosure is to propose a rare earth mine tailwater ecological treatment method, which aims to solve the technical problems of traditional rare earth mine tailwater treatment methods, such as high energy consumption, high operating costs, and low treatment efficiency.

To achieve the above purpose, a technical solution adopted by the present disclosure is to provide a membrane aeration bioreactor (MABR)-based method for treating rare earth mine tailwater, comprising:

S1: introducing rare earth mine tailwater into a sedimentation pond and simultaneously injecting pig farm breeding tailwater into the sedimentation pond, wherein a volume ratio of the rare earth mine tailwater to the pig farm breeding tailwater is 5 to 30:1; and fully mixing the rare earth mine tailwater to the pig farm breeding tailwater in the sedimentation pond for solid particulate sedimentation;

S3: overflowing the sedimentation-treated rare earth mine tailwater from the sedimentation pond to a conditioning tank, and adding a pH adjusting agent to the conditioning tank to adjust a pH of the rare earth mine tailwater to 6.5 to 7.0;

S5: delivering the pH-adjusted rare earth mine tailwater to a membrane aeration bioreactor for MABR enhancement treatment; wherein the membrane aeration bioreactor comprises a rectangular pool body, an inner wall of the rectangular pool body is covered with a geomembrane impermeable layer, a membrane assembly is fixed in the rectangular pool body, and air is supplied to the membrane assembly through a main air delivery pipe, causing the membrane assembly to carry out microporous aeration and provide an attachment environment for microorganisms in the membrane aeration bioreactor;

S7: overflowing the MABR-enhanced rare earth mine tailwater to a percolation dam for percolation treatment;

S9: overflowing the percolation-treated rare earth mine tailwater to an ecological purification pond for ecological purification; wherein the ecological purification pond comprises a soil pond, an inner wall of the soil pond is covered with another geomembrane impermeable layer, and the another geomembrane impermeable layer is covered with a common soil layer; after the rare earth mine tailwater is passed into the ecological purification pond, submerged plants and emergent plants are planted on the common soil layer; and S11: overflowing and discharging the rare earth mine tailwater purified by the ecological purification pond to a natural water body.

In some embodiments, before the percolation-treated rare earth mine tailwater enters the ecological purification pond, the method further comprises:

S8: overflowing the percolation-treated rare earth mine tailwater to a vertical submerged wetland for purification treatment;

wherein the vertical submerged wetland comprises a zeolite filler, water is distributed from a top to a bottom, and an aeration device is arranged at the bottom; the zeolite filler is planted with aquatic plants, and the aquatic plants are any combination of one or more of barracuda, reefer, tumbleweed, water onion, iris, and flower-leaved reed bamboo.

In some embodiments, the MABR-enhanced rare earth mine tailwater is partially returned to the conditioning tank to participate in pH and concentration adjustment of the rare earth mine tailwater.

In some embodiments, the pH adjusting agent comprises sodium carbonate.

In some embodiments, the membrane assembly comprises a support frame and an air inlet pipe fixed on the support frame; a top of the air inlet pipe is connected to the main air delivery pipe through a branch air delivery pipe, and a bottom of the air inlet pipe is closed; a side wall of the air inlet pipe defines a plurality of membrane filament connecting holes, and the plurality of membrane filament connecting holes are each fixedly connected to an inlet end of a membrane filament; the membrane filament further comprises an outlet end, and the outlet end is fixedly connected to an air outlet pipe; the air outlet pipe is connected to an air collection pipe; the membrane filament is a hollow filamentary structure surrounded by modified polyvinylidene fluoride fiber membrane.

In some embodiments, the plurality of membrane filament connecting holes are arranged in 6-12 groups along an axial direction and are radially symmetrical with the air inlet pipe, and an outlet end of each group of the membrane filaments is connected to a corresponding air outlet pipe that is vertically arranged.

In some embodiments, the membrane filament is connected to an adjacent membrane filament in a horizontal direction by a nylon screen.

In some embodiments, the air outlet pipe is at an angle of 30-60 degrees from the horizontal direction, and each group of the membrane filaments is spiraled upward with the air inlet pipe as a center under a pulling of the air outlet pipe.

In some embodiments, the membrane filament is connected to an adjacent membrane filament in a vertical direction by a nylon screen.

In some embodiments, a top of the air inlet pipe is fixedly connected to the support frame through an upper bracket, and a bottom of the air inlet pipe is fixedly connected to the support frame through a lower bracket; the bottom of the air inlet pipe further comprises a flow stopper, and the rare earth mine tailwater is delivered to the membrane aeration bioreactor through a water distribution pipe; the water distribution pipe is fixed to a bottom of the membrane aeration bioreactor through a water pipe bracket, and a water outlet of the water distribution pipe is arranged directly below the flow stopper.

In some embodiments, the water distribution pipe defines a plurality of water outlets, and each water outlet corresponds to a membrane assembly; each water outlet is connected to a water outlet valve.

In some embodiments, the air collection pipe is connected to the ecological purification pond for aeration.

In some embodiments, walls of the sedimentation pond are arranged with water retaining walls that are staggered and fixedly connected to the walls along a direction of water flow, and the water retaining walls form a zigzag waterway in the sedimentation pond.

In some embodiments, the percolation dam comprises limestone as filler.

In some embodiments, a water depth of the ecological purification pond is set to 1.0-1.8 m, and the emergent plants are any combination of one or more of plantain, water onion, reed, and vetiver; the submerged plants are one or two of foxtail algae and bitter grass.

The beneficial effects of the present disclosure are as follows.

By introducing a low-cost carbon source such as pig farm breeding tailwater for synergistic treatment with rare earth mine tailwater, the embodiments of the present disclosure are less costly compared to traditional treatment methods and has a higher ecological effect at the same time. In addition, the membrane aeration bioreactor in the MABR enhancement treatment can be well adapted to the low carbon to nitrogen ratio water environment through the anisotropic mass transfer structure and simultaneous nitrification and denitrification; moreover, the microporous aeration through the membrane improves the utilization rate of oxygen in the air supply, thereby saving the air supply in the aeration reaction and further reducing the cost of rare earth mine tailwater treatment. The above design can effectively solve the technical problem of high energy consumption caused by the huge demand of carbon source supply and oxygen supply in the existing technology.

BRIEF DESCRIPTION OF THE DRAWINGS

In order to more clearly illustrate the technical solution of the embodiments of the present disclosure, the following drawings will be briefly described for use in the embodiments or related art. It can be understood that the following drawings only illustrate certain embodiments of the present disclosure, and other relevant drawings can be obtained according to these drawings without creative work for those skilled in the art.

DETAILED DESCRIPTION

The technical solutions in the embodiments of the present disclosure will be clearly and completely described below in conjunction with the accompanying drawings in the embodiments of the present disclosure. It is clear that the described embodiments are only a part of the embodiments of the present disclosure, and not all of them. Based on the embodiments in the present disclosure, all other embodiments obtained by those skilled in the art without making creative labor fall within the scope of the present disclosure.

It should be noted that if there are embodiments of the present disclosure involving directional indications (such as up, down, left, right, forward, back), the directional indications are intended only to explain the relative position relationship, movement, etc. between parts in a particular attitude, and when that particular attitude is changed, the directional indications are changed accordingly.

Figure 1:
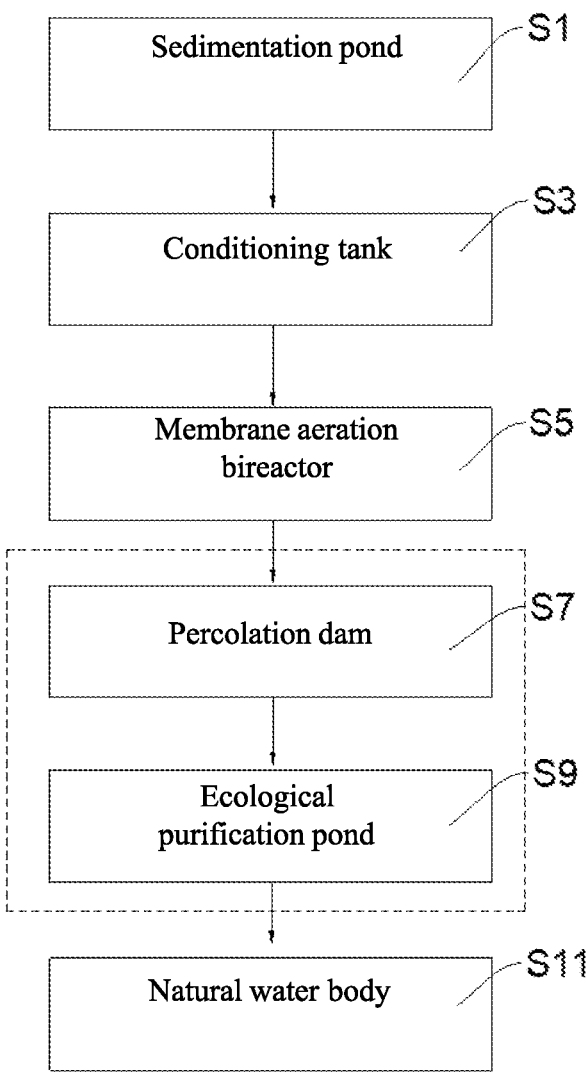
FIG. 1 is a schematic flowchart I of a MABR-based method for treating rare earth mine tailwater according to the present disclosure.
Figure 2:
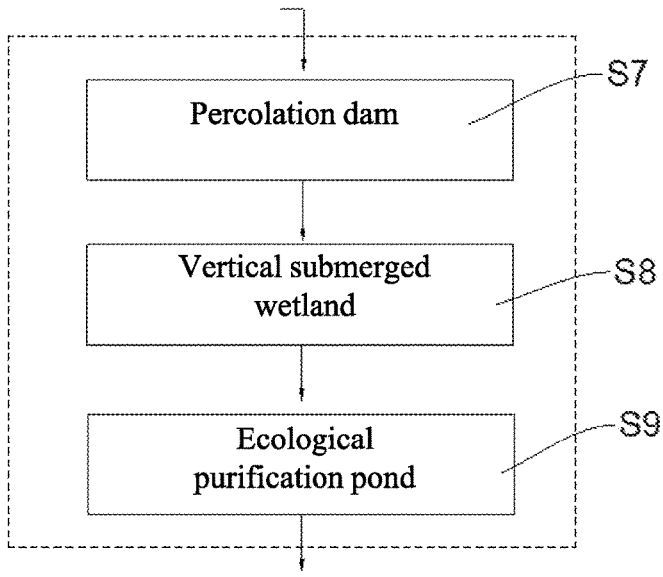
FIG. 2 is a schematic flowchart II of a MABR-based method for treating rare earth mine tailwater according to the present disclosure.
Figure 3:
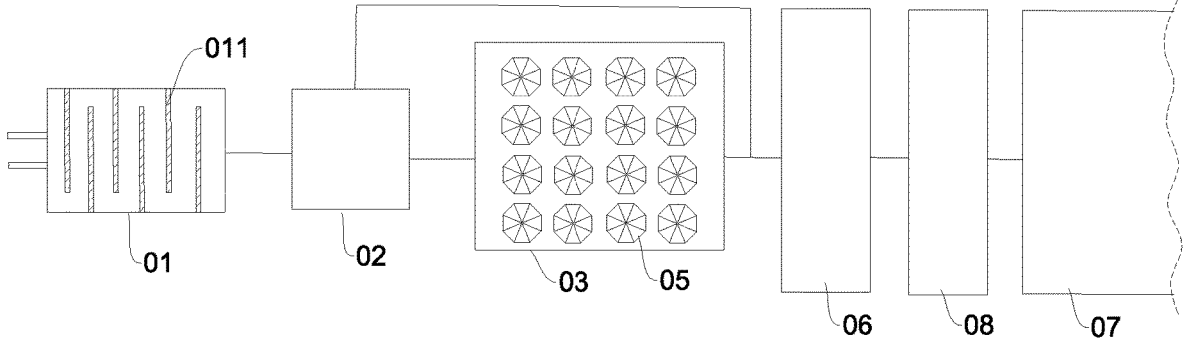
FIG. 3 is a module schematic view of a MABR-based method for treating rare earth mine tailwater according to the present disclosure.
Figure 4:
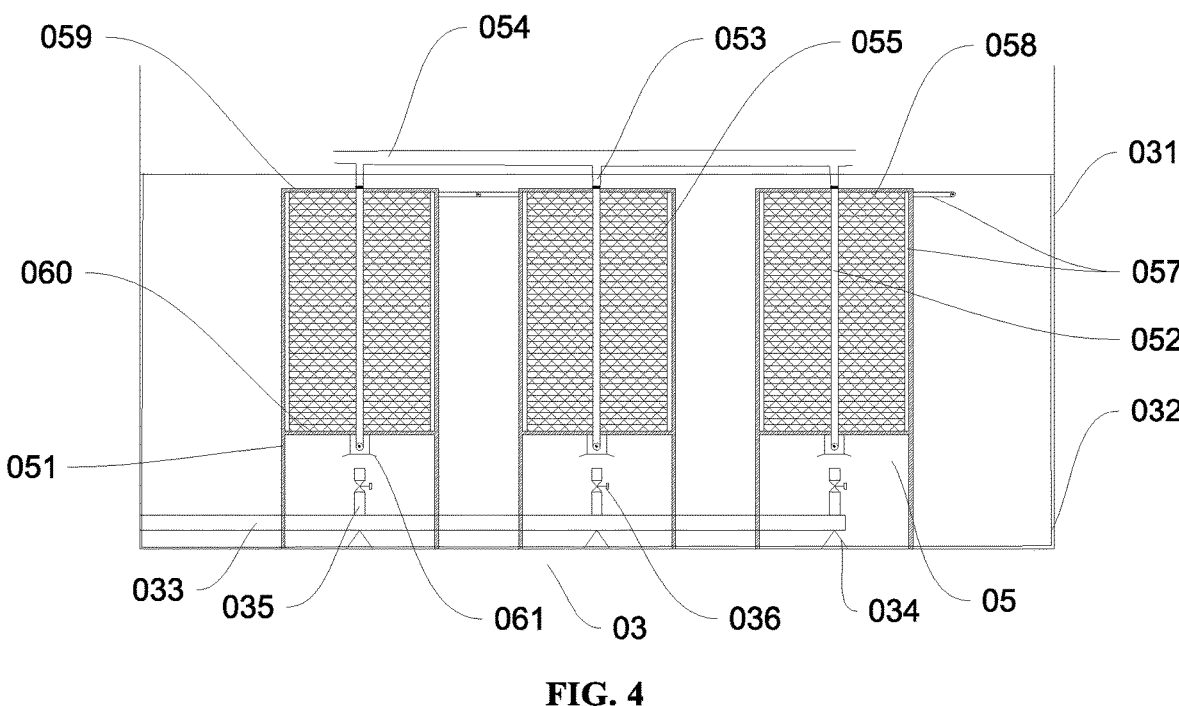
FIG. 4 is a structural schematic view I of a membrane aeration bioreactor of a MABR-based method for treating rare earth mine tailwater according to the present disclosure.
Figure 5:
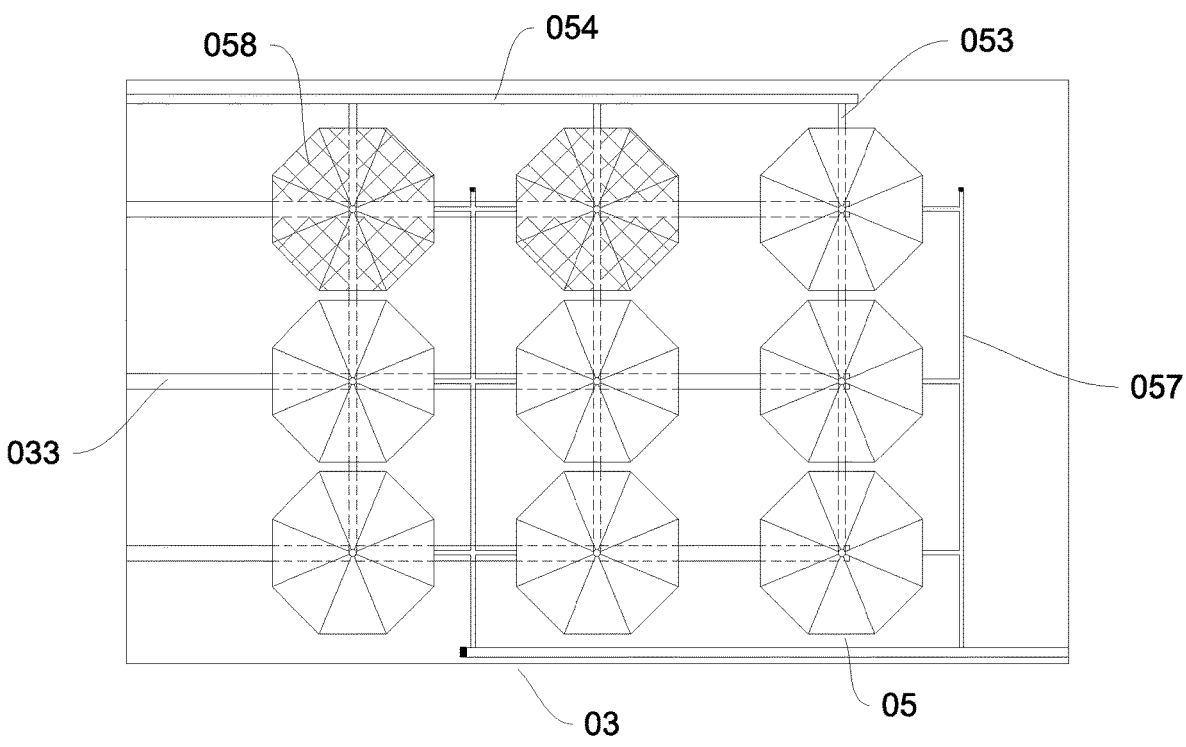
FIG. 5 is a structural schematic view II of a membrane aeration bioreactor of a MABR-based method for treating rare earth mine tailwater according to the present disclosure.
Figure 6:
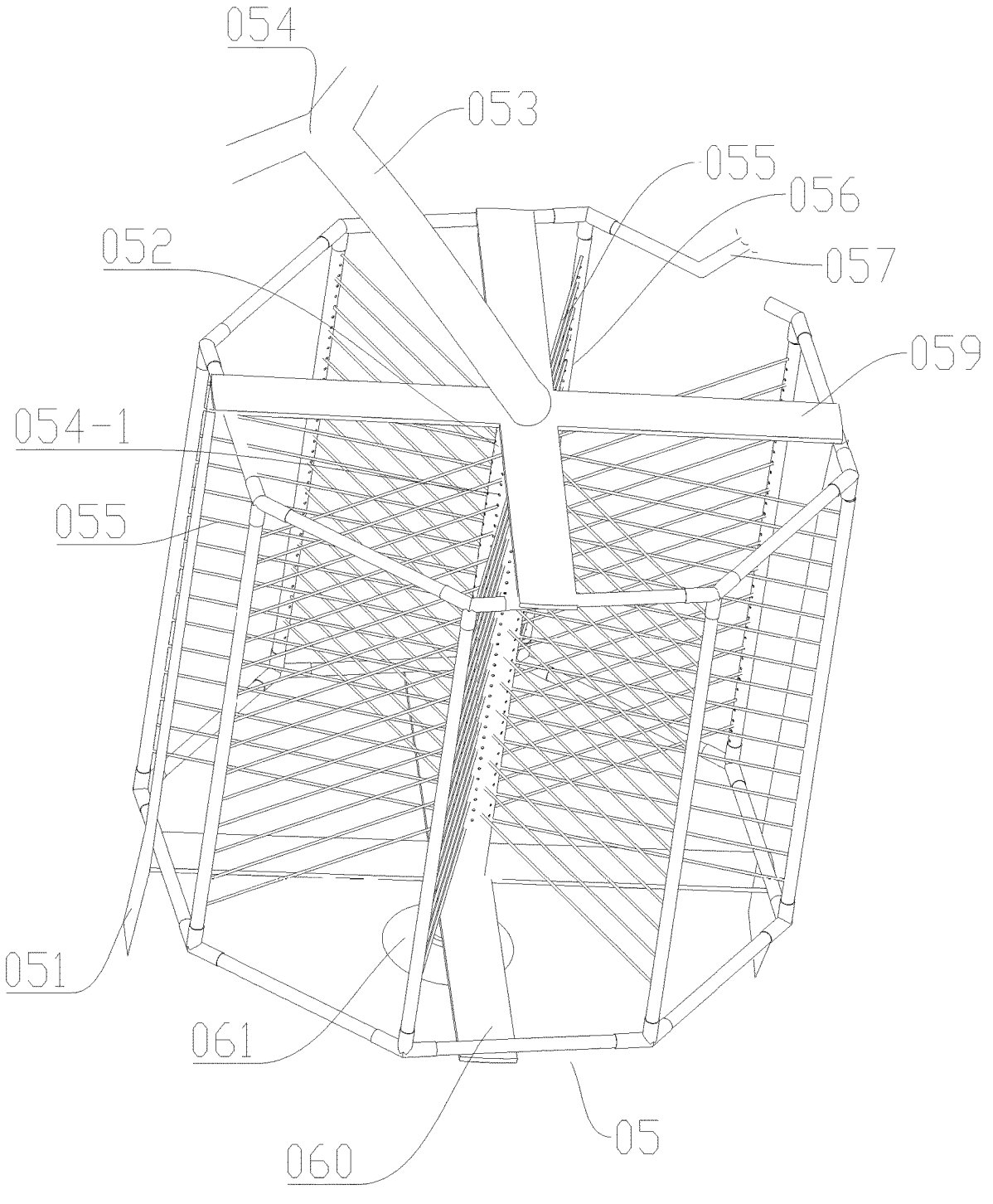
FIG. 6 is a structural schematic view I of a membrane assembly of a MABR-based method for treating rare earth mine tailwater according to the present disclosure.
Figures 7, 8:
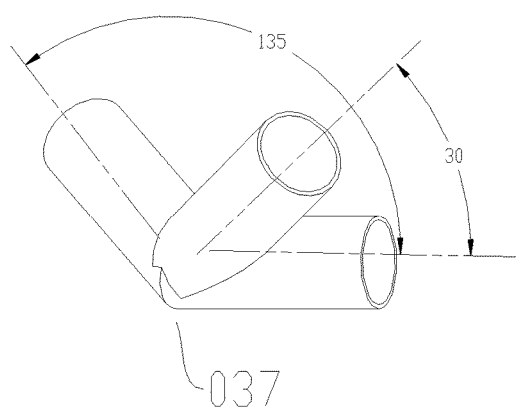
FIG. 7 is a structural schematic view II of a membrane assembly of a MABR-based method for treating rare earth mine tailwater according to the present disclosure.
FIG. 8 is a structural schematic view of a Y-shaped tee of a MABR-based method for treating rare earth mine tailwater according to the present disclosure.
Figure 9:
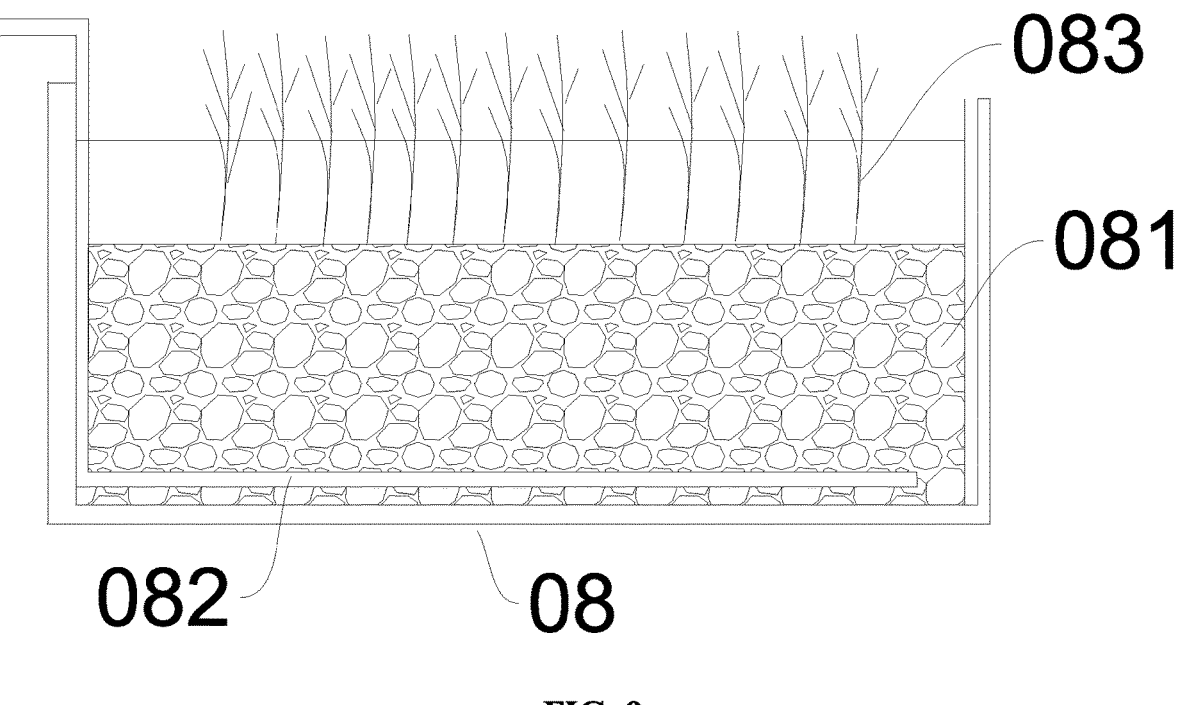
FIG. 9 is a structural schematic view of a vertical submerged wetland of a MABR-based method for treating rare earth mine tailwater according to the present disclosure.
Figure 10:
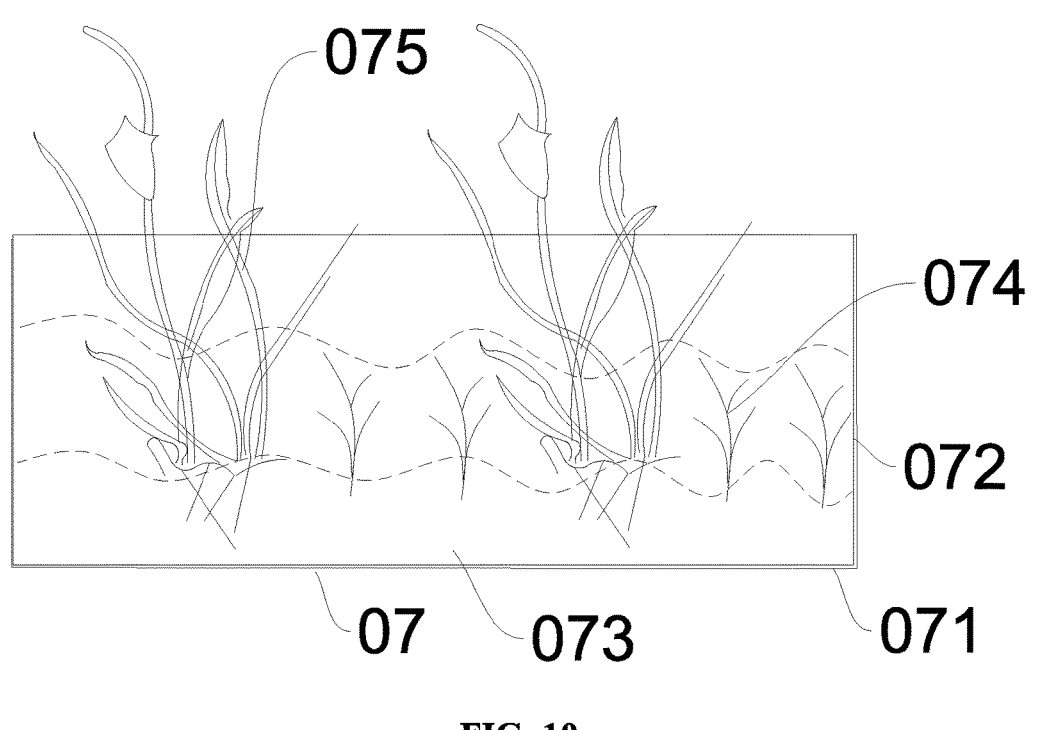
FIG. 10 is a structural schematic view of an ecological purification pond of a MABR-based method for treating rare earth mine tailwater according to the present disclosure.
Figure 11:
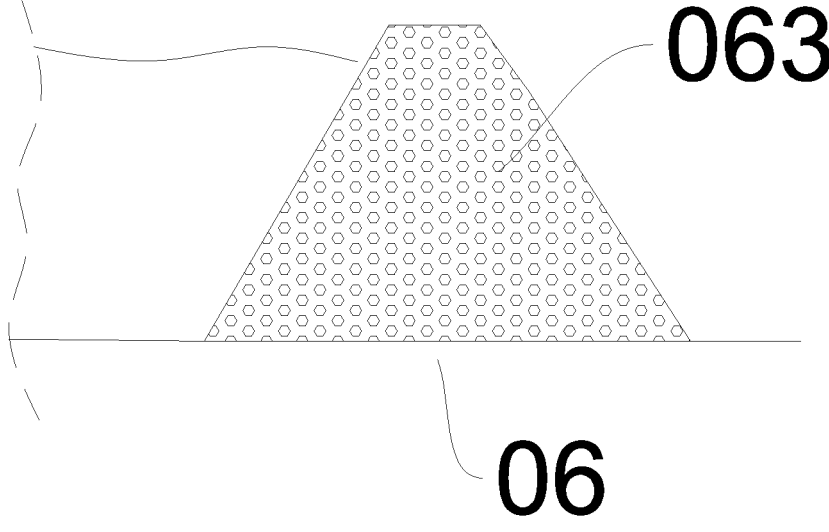
FIG. 11 is a s structural schematic view of a percolation dam of a MABR-based method for treating rare earth mine tailwater according to the present disclosure.

Referring to FIGS. 1 to 11, embodiments of the present disclosure propose a MABR-based method for treating rare earth mine tailwater, specifically including operations at blocks illustrated herein.

At block S1: introducing rare earth mine tailwater into a sedimentation pond 01 and simultaneously injecting pig farm breeding tailwater into the sedimentation pond 01, where a volume ratio of the rare earth mine tailwater to the pig farm breeding tailwater is 5 to 30:1; and fully mixing the rare earth mine tailwater to the pig farm breeding tailwater in the sedimentation pond 01 for solid particulate sedimentation.

At block S3: overflowing the sedimented rare earth mine tailwater from the sedimentation pond 01 to a conditioning tank 02, and adding a pH adjusting agent to the conditioning tank 02 to adjust a pH of the rare earth mine tailwater to 6.5 to 7.0.

At block S5: delivering the pH-adjusted rare earth mine tailwater to a membrane aeration bioreactor 03 for MABR enhancement treatment, where the membrane aeration bioreactor 03 includes a rectangular pool body 031, an inner wall of the rectangular pool body 031 is covered with a geomembrane impermeable layer 032, a membrane assembly 05 is fixed in the rectangular pool body 031, and air is supplied to the membrane assembly 05 through a main air delivery pipe 054, causing the membrane assembly 05 to carry out microporous aeration and provide a good attachment environment for microorganisms in the membrane aeration bioreactor.

At block S7: overflowing the MABR-enhanced rare earth mine tailwater to a percolation dam 06 for percolation treatment.

At block S9: overflowing the percolation treated rare earth mine tailwater to an ecological purification pond 07 for ecological purification, where the ecological purification pond 07 includes a soil pond 071, an inner wall of the soil pond 071 is covered with a geomembrane impermeable layer 072, and the geomembrane impermeable layer 072 is covered with a common soil layer 073; after the rare earth mine tailwater is passed into the ecological purification pond 07, submerged plants 074 and emergent plants 075 are planted on the common soil layer.

At block S11: overflowing and discharging the rare earth mine tailwater purified by the ecological purification pond 07 to a natural water body.

The rare earth mine tailwater is acidic (pH 3-5) with low carbon to nitrogen ratio ($COD_{Cr}$≤20 mg/L, ammonia nitrogen: 50-300 mg/L), while the pig farm breeding tailwater pretreated by solid-liquid separation is slightly alkaline (pH 7-9) with high carbon to nitrogen ratio ($COD_{Cr}$: 5000-30, 000 mg/L, ammonia nitrogen: 100-300 mg/L). While the rare earth mine tailwater is injected into the sedimentation pond, the pig farm breeding tailwater is continuously injected into the sedimentation pond through a water tanker or liquid supply pipe, where the volume ratio of the rare earth mine tailwater to the pig farm breeding tailwater is 5-30:1. While the rare earth mine tailwater is treated with solid particulate sedimentation, the pig farm breeding tailwater is fully mixed with the rare earth mine tailwater, thereby increasing the carbon content of the rare earth mine tailwater, promoting rapid membrane attachment of the membrane assembly in the subsequent MABR enhancement treatment process, and providing a carbon source for the metabolism of the microbial membranes attached to the membrane assembly. The pH adjusting agent is added to the conditioning tank to adjust the pH of the rare earth mine tailwater to 6.57.0, which promotes rapid membrane attachment of the membrane assembly in the subsequent MABR enhancement treatment process. MABR in MABR enhancement treatment refers to membrane aeration bioreactor, which performs microporous aeration through membrane to provide oxygen for microorganisms attached to the membrane. The membrane is a hollow fiber membrane, which serves as a carrier for microorganisms to attach and for bubble-free aeration. When the tailwater flows around the membrane with microorganisms attached, organic matter, ammonia nitrogen, and other pollutants in the water body enter the microbial membrane under the effect of concentration difference drive and microbial adsorption, etc., and are used by microorganisms through their metabolism and reproduction, thereby achieving the effect of tailwater purification. After the MABR enhancement treatment, the rare earth mine tailing water overflows to the percolation dam, and is filtered and adsorbed by the percolation dam for particulate matter and pollutants in the water, while adjusting the pH value of the water. The percolation treated rare earth mine tailwater overflows to the ecological purification pond and is ecologically purified by the self-purification capacity of the ecological purification pond, which finally meets the discharge standard and is discharged to the natural water body.

It should be noted that the volume ratio of 5-30:1 between the rare earth mine tailwater and the pig farm breeding tailwater pretreated by solid-liquid separation should be adjusted according to the carbon to nitrogen ratio in the rare earth mine tailwater and pig farm breeding tailwater, where the carbon to nitrogen ratio of the fully mixed rare earth mine tailwater is maintained at 4-6:1, which is more suitable for the subsequent steps of MABR enhancement treatment, avoiding the need to invest a large amount of carbon source. The overall carbon to nitrogen ratio of the fully mixed rare earth mine tailwater will also remain the same after subsequent dilution or pH adjustment processes.

The ecological method for treating rare earth mine tailwater proposed by the present embodiment is less costly and has a higher ecological effect than the traditional treatment method by introducing a low-cost carbon source such as pig farm breeding tailwater pretreated with solid-liquid separation for synergistic treatment with the rare earth mine tailwater. In addition, the membrane aeration bioreactor in the MABR enhancement treatment carries out microporous aeration through the membrane, which improves the utilization rate of oxygen in the air supply, thereby saving the air supply in the aeration reaction and further reducing the cost of rare earth mine tailwater treatment. The above can effectively solve the technical problem of high energy consumption caused by the huge need for carbon source supply and oxygen supply in the related art.

In some embodiments, before the percolation-treated rare earth mine tailwater enters the ecological purification pond 07, the method further includes S8.

S8: overflowing the percolation-treated rare earth mine tailwater to a vertical submerged wetland 08 for purification treatment.

The vertical submerged wetland 08 includes a zeolite filler 081, water is distributed from top to bottom, and an aeration device 082 is arranged at the bottom. The zeolite filler 081 is planted with aquatic plants 083, and the aquatic plants may be any combination of one or more of barracuda, reefer, tumbleweed, water onion, iris, and flower-leaved reed bamboo. The vertical submerged wetland allows for the adsorption of particulate matter and pollutants therein by zeolite fillers before the overflow of the rare earth mine tailwater to the ecological purification pond.

In some embodiments, the MABR enhancement treated rare earth mine tailwater may be partially returned to the conditioning tank to participate in pH and concentration adjustment of the rare earth mine tailwater.

In some embodiments, the pH adjusting agent includes sodium carbonate.

In some embodiments, the membrane aeration bioreactor 03 includes a rectangular body 031, the rectangular body 031 has an inner wall covered with a geomembrane impermeable layer 032, and a membrane assembly 05 is fixed in the rectangular body 031. The membrane assembly 05 includes a support frame 051 and an air inlet pipe 052 fixed on the support frame 051. A top of the air inlet pipe 052 is connected to a main air delivery pipe 054 through a branch air delivery pipe 053, and a bottom of the air inlet pipe 052 is closed. A side wall of the air inlet pipe 052 defines multiple membrane filament connecting holes 054-1, and the membrane filament connecting holes 054-1 are fixedly connected to an inlet end of a membrane filament 055. The membrane filament further includes an outlet end, and the outlet end is fixedly connected to an air outlet pipe 056. The air outlet pipe 056 is connected to an air collection pipe 057. The membrane filament is a hollow filamentary structure surrounded by modified polyvinylidene fluoride fiber membrane. By feeding air into the air inlet pipe, the air in the air inlet pipe enters the membrane filament, and since the membrane filament is a hollow fiber membrane, the membrane allows oxygen in the air to pass through, and then the oxygen in the membrane filament passes through the membrane and is absorbed and consumed by the microorganisms attached outside the membrane for their own metabolism and reproduction. The microorganisms carry out nitrification and denitrification, short-course nitrification denitrification or anaerobic ammonia oxidation. Nitrification is to transform ammonia nitrogen into nitrate nitrogen by nitrifying bacteria, and the main biochemical reaction conditions are water temperature, dissolved oxygen, and alkalinity. Denitrification is to transform nitrate nitrogen into nitrogen gas by denitrifying bacteria, and the main biochemical reaction conditions are water temperature and carbon source in the pig farm breeding tailwater mixed in the sedimentation pond stage. After a series of reactions, the microorganisms attached to the membrane filaments not only absorb the ammonia nitrogen in the tailwater, but also absorb the organic matter in the pig farm breeding tailwater mixed in the sedimentation pond stage, thereby achieving the effect of synergistic treatment of both tailwaters. In addition, compared with the conventional plate aeration membrane, the effective aeration area of the hollow fibrous membrane filament increases exponentially, which accelerates the attachment and metabolic efficiency of the microbial membrane and thus promotes the treatment efficiency of the tailwater.

Specifically, in other embodiments, the membrane filament connecting holes 054-1 are arranged in 6-12 groups along an axial direction and are radially symmetrical with the air inlet pipe 052, and an outlet end of each group of membrane filaments 055 is connected to a vertical outlet pipe 056. The membrane filaments are radially symmetrical along the axis of the air inlet pipe and are arranged in groups to disperse the membrane assembly into a barrel shape in the tailwater, which effectively increases the water passage area of the membrane filaments and improves the efficiency of the membrane assembly in treating the tailwater.

In some embodiments, the membrane filaments 055 are connected to the adjacent filaments 055 in a horizontal direction by a nylon screen 058. The nylon screen may fix the horizontally adjacent membrane filaments to reduce the oscillation of the filaments in the tailwater and promote the formation of microbial membranes and their growth and metabolism.

In some embodiments, the air outlet pipe 056 is at an angle of 30-60 degrees from the horizontal direction, and each group of membrane filaments 055 is spiraled upward with the air inlet pipe 052 as a center under the pulling of the air outlet pipe. An upper end of the air outlet pipe 056 is connected to the air collection pipe 057 through a Y-shaped tee 037, and a lower end of the air outlet pipe 056 is fixedly connected to a membrane filament fixing pipe 038 through the Y-shaped tee. The upper and lower ends of the air outlet pipe is fixed by the Y-shaped tee, and the air outlet pipe is inclined at an angle of 30-60 degrees to the horizontal direction by a staggered connection; since the tail end of the membrane filament is fixed to the air outlet pipe, each group of axial membrane filaments forms a spiral ascending shape with the air inlet pipe as the center, and this structure may ensure that the membrane filaments are evenly dispersed and fixed in the axial and radial directions of the air inlet pipe, which increases the treatment area of the membrane filaments and greatly enhances the efficiency of the membrane assembly in treating the tailwater. In particular, in a case that the tailwater is distributed from the bottom to the top, it may be ensured that the air inlet pipe is distributed with membrane filaments in the radial direction to increase the water-facing surface of the membrane assembly, which greatly enhances the efficiency of the membrane assembly in treating tailwater.

Specifically, in some embodiments, the angle between the horizontal two connecting ends of the Y-shaped tee is 135 degrees, and the angle between the vertical connecting end and the horizontal plane is 30-60 degrees. The angle between the horizontal two connecting ends is 135 degrees, which can make the air collection pipes meet at the beginnings and ends to form a positive octagonal shape. This structure can connect 8 air outlet pipes, corresponding to 8 groups of membrane filaments, which has a moderate density of membrane filaments and a stable structure of the air outlet pipe.

Specifically, in other embodiments, the membrane filaments 055 are connected to the adjacent membrane filaments 055 in a vertical direction by a nylon screen 058. The nylon screen may fix the vertically adjacent membrane filaments to reduce the oscillation of the filaments in the tailwater and promote the formation of microbial membranes and their growth and metabolism.

In some embodiments, the top of the air inlet pipe 052 is fixedly connected to the support frame 051 through an upper bracket 059, and the bottom of the air inlet pipe 052 is fixedly connected to the support frame 051 through a lower bracket 060. The bottom of the air inlet pipe 052 further includes a flow stopper 061, and the rare earth mine tailwater is delivered to the membrane aeration bioreactor 03 through a water distribution pipe 033. The water distribution pipe 033 is fixed to the bottom of the membrane aeration bioreactor 03 through a water pipe bracket 034, and a water outlet 035 of the water distribution pipe 033 is arranged directly below the flow stopper. The water distribution below the membrane assembly can make use of the inertia of the tailwater itself to promote the uniform distribution of the tailwater around the membrane filament, thereby improving the treatment efficiency of the membrane assembly, while the setting of the flow stopper can reduce the momentum of the upward movement of the tailwater, thereby reducing the impact of the tailwater on the microbial membranes attached to and formed on the membrane filament, improving the stability of the microbial membranes, and further improving the treatment efficiency of the membrane assembly.

In some embodiments, the water distribution pipe 033 defines water outlets 035, and each water outlet 035 corresponds to a membrane assembly 05. Each water outlet 035 is connected to a water outlet valve 036, through which the speed of the membrane assembly may be adjusted according to specific condition of the microbial membranes attached to the membrane filaments, thereby flexibly and efficiently adjusting the progress of the tailwater treatment.

In some embodiments, the air collection pipe 057 is connected to the ecological purification pond 07 for aeration. The residual air from the collector is reused to reduce the overall treatment cost of the tailwater.

In some embodiments, walls of the sedimentation pond 01 are arranged with water retaining walls 011 that are staggered and fixedly connected to the walls along the direction of water flow, and the water retaining walls 011 form a zigzag waterway in the sedimentation pond 01. The setting of the multiple water retaining walls can extend the flow path of the rare earth mine tailwater in the sedimentation pond, which may further reduce the flow velocity of the rare earth mine tailwater, promote the sedimentation of solid particles in the rare earth mine tailwater, and reduce the occupied space of the sedimentation pond.

In some embodiments, the percolation dam 06 includes limestone 063 as filler. The limestone effectively adsorbs particulate matter in the tailwater after the MABR enhancement treatment and regulates the pH of the tailwater.

In some embodiments, the water depth of the ecological purification pond is set to 1.0-1.8 m, and the emergent plants are any combination of one or more of plantain, water onion, reed, and vetiver; the submerged plants are one or two of foxtail algae and bitter grass.

The above mentioned is only some embodiments of the present disclosure, not to limit the scope of the present disclosure. Any equivalent structural transformation made under the inventive concept of the present disclosure using the specification of the present disclosure and the contents of the attached drawings, or directly/indirectly applied in other related technical fields are included in the scope of the present disclosure.

What is claimed is:

1. A membrane aeration bioreactor (MABR)-based method for treating rare earth mine tailwater, comprising:
   introducing a rare earth mine tailwater into a sedimentation pond and simultaneously injecting pig farm breeding tailwater into the sedimentation pond, wherein a volume ratio of the rare earth mine tailwater to the pig farm breeding tailwater is 5 to 30:1; and fully mixing the rare earth mine tailwater to the pig farm breeding tailwater in the sedimentation pond for solid particulate sedimentation;
   overflowing the rare earth mine tailwater after solid particulate sedimentation from the sedimentation pond to a conditioning tank, and adding a pH adjusting agent to the conditioning tank to adjust a pH of the rare earth mine tailwater after solid particulate sedimentation to 6.5 to 7.0;
   delivering the rare earth mine tailwater after pH adjustment to a membrane aeration bioreactor for MABR enhancement treatment; wherein the membrane aeration bioreactor comprises a rectangular pool body, an inner wall of the rectangular pool body is covered with a geomembrane impermeable layer, a membrane assembly is fixed in the rectangular pool body, and air is supplied to the membrane assembly through a main air delivery pipe, causing the membrane assembly to carry out microporous aeration and provide an attachment environment for microorganisms in the membrane aeration bioreactor;
   overflowing the rare earth mine tailwater after MABR enhancement treatment to a percolation dam for percolation treatment;
   overflowing the rare earth mine tailwater after percolation treatment to an ecological purification pond for ecological purification; wherein the ecological purification pond comprises a soil pond, an inner wall of the soil pond is covered with another geomembrane impermeable layer, the another geomembrane impermeable layer is covered with a common soil layer, and submerged plants and emergent plants are planted on the common soil layer; and
   overflowing and discharging the rare earth mine tailwater purified by the ecological purification pond to a natural water body.

2. The method according to claim 1, before the step of overflowing the rare earth mine tailwater after percolation treatment to the ecological purification pond, further comprising:
   overflowing the rare earth mine tailwater after percolation treatment to a vertical submerged wetland for purification treatment;
   wherein the vertical submerged wetland comprises a zeolite filler, water is distributed from a top to a bottom, and an aeration device is arranged at the bottom; the zeolite filler is planted with aquatic plants, and the aquatic plants are any combination of one or more of barracuda, reefer, tumbleweed, water onion, iris, and flower-leaved reed bamboo.

3. The method according to claim 1, wherein rare earth mine tailwater after MABR enhancement treatment is partially returned to the conditioning tank to participate in pH and concentration adjustment of the rare earth mine tailwater.

4. The method according to claim 1, wherein the pH adjusting agent comprises sodium carbonate.

5. The method according to claim 1, wherein the membrane assembly comprises a support frame and an air inlet pipe fixed on the support frame; a top of the air inlet pipe is connected to the main air delivery pipe through a branch air delivery pipe, and a bottom of the air inlet pipe is closed; a side wall of the air inlet pipe defines a plurality of membrane filament connecting holes, and the plurality of membrane filament connecting holes are each fixedly connected to an inlet end of a membrane filament; the membrane filament further comprises an outlet end, and the outlet end is fixedly connected to an air outlet pipe; the air outlet pipe is connected to an air collection pipe; the membrane filament is a hollow filamentary structure surrounded by modified polyvinylidene fluoride fiber membrane.

6. The method according to claim 5, wherein the plurality of membrane filament connecting holes are arranged in 6-12 groups along an axial direction and are radially symmetrical with the air inlet pipe, and an outlet end of each group of the membrane filaments is connected to a corresponding air outlet pipe that is vertically arranged.

7. The method according to claim 6, wherein the membrane filament is connected to an adjacent membrane filament in a horizontal direction by a nylon screen.

8. The method according to claim 1, wherein walls of the sedimentation pond are arranged with water retaining walls that are staggered and fixedly connected to the walls along a direction of water flow, and the water retaining walls form a zigzag waterway in the sedimentation pond.

9. The method according to claim 1, wherein the percolation dam comprises limestone as filler.

10. The method according to claim 1, wherein a water depth of the ecological purification pond is set to 1.0-1.8 m, and the emergent plants are any combination of one or more of plantain, water onion, reed, and vetiver; the submerged plants are one or two of foxtail algae and bitter grass.

11. The method according to claim 7, wherein the air outlet pipe is at an angle of 30-60 degrees from the horizontal direction, and each group of the membrane filaments is spiraled upward with the air inlet pipe as a center.

12. The method according to claim 6, wherein the membrane filament is connected to an adjacent membrane filament in a vertical direction by a nylon screen.

13. The method according to claim 6, wherein a top of the air inlet pipe is fixedly connected to the support frame through an upper bracket, and a bottom of the air inlet pipe is fixedly connected to the support frame through a lower bracket; the bottom of the air inlet pipe further comprises a flow stopper, and the rare earth mine tailwater after pH adjustment is delivered to the membrane aeration bioreactor through a water distribution pipe; the water distribution pipe is fixed to a bottom of the membrane aeration bioreactor through a water pipe bracket, and a water outlet of the water distribution pipe is arranged directly below the flow stopper.

14. The method according to claim 13, wherein the water distribution pipe defines a plurality of water outlets, the membrane aeration bioreactor comprises a plurality of membrane assemblies and each water outlet corresponds to a corresponding membrane assembly; each water outlet is connected to a water outlet valve.

15. The method according to claim 6, wherein the air collection pipe is connected to the ecological purification pond for aeration.

* * * * *